United States Patent
Bierma

(10) Patent No.: US 6,935,447 B2
(45) Date of Patent: Aug. 30, 2005

(54) STAIR-CLIMBING HAND TRUCK

(76) Inventor: Jochum Bierma, Schablederweg 54, A 4040 Linz (AT)

( * ) Notice: Subject to any disclaimer, the term of this patent is extended or adjusted under 35 U.S.C. 154(b) by 0 days.

(21) Appl. No.: 10/791,993

(22) Filed: Mar. 3, 2004

(65) Prior Publication Data

US 2004/0188960 A1 Sep. 30, 2004

(30) Foreign Application Priority Data

Mar. 4, 2003 (AT) .......................................... A 312/2003

(51) Int. Cl.[7] .............................................. B62D 51/06
(52) U.S. Cl. ...................... 180/8.2; 180/8.3; 280/47.21; 280/47.27
(58) Field of Search ...................... 280/DIG. 10, 47.21, 280/47.27, 5.2; 180/8.1–8.7

(56) References Cited

U.S. PATENT DOCUMENTS

| | | | | |
|---|---|---|---|---|
| 3,494,440 A | * | 2/1970 | Hanson | 180/8.2 |
| 3,499,501 A | * | 3/1970 | Bauer | 180/8.2 |
| 3,788,413 A | * | 1/1974 | Miller | 180/8.2 |
| 5,042,827 A | * | 8/1991 | Mortenson | 280/5.22 |
| 6,164,398 A | * | 12/2000 | Alber | 180/8.2 |
| 6,386,552 B1 | * | 5/2002 | Bierma | 280/5.28 |
| 6,397,960 B2 | * | 6/2002 | Alber | 180/8.2 |
| 6,402,161 B1 | * | 6/2002 | Baghdadi | 280/5.2 |
| 6,752,400 B2 | * | 6/2004 | Nakatsukasa et al. | 280/5.2 |

FOREIGN PATENT DOCUMENTS

| | | |
|---|---|---|
| DE | 19519 109 A1 | 5/1995 |
| EP | 0 903 278 A2 | 3/1999 |
| EP | 1 129 923 A2 | 9/2001 |

* cited by examiner

Primary Examiner—Tony Winner
(74) Attorney, Agent, or Firm—Collard & Roe, P.C.

(57) ABSTRACT

A stair-climbing hand truck comprising two casters held in a chassis and a supporting foot constituted by a two-arm lever having a lower support end and an upper end, a supporting foot guide connected to and guiding the upper end of the two-arm lever, a connecting rod having one end linked to the two-arm lever between the lower support end and the upper end, and an end opposite to the one end guided in a connecting rod guide extending transversely to the supporting foot guide, and a crank mechanism connected to the connecting rod.

3 Claims, 2 Drawing Sheets

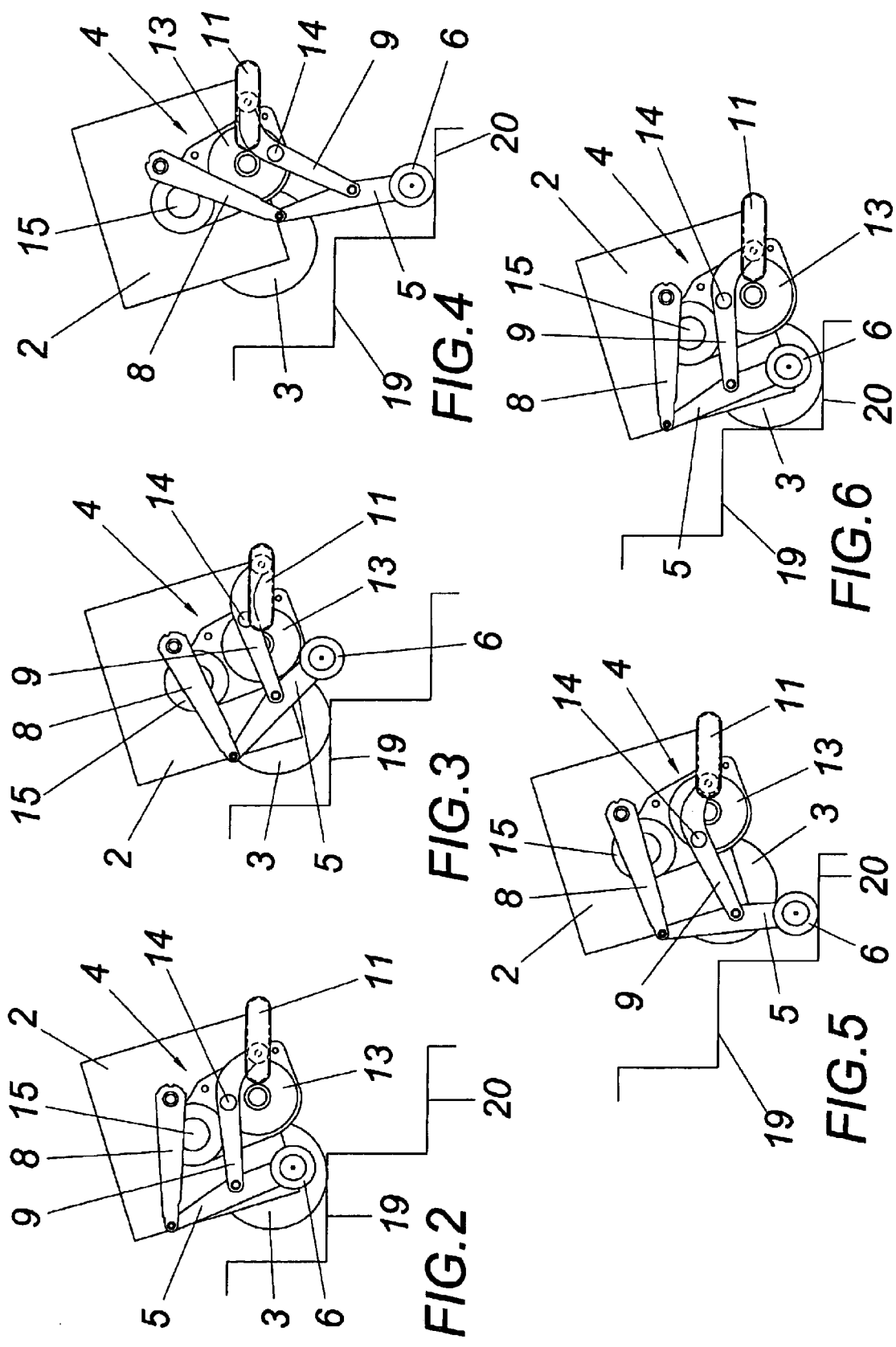

STAIR-CLIMBING HAND TRUCK

FIELD OF THE INVENTION

The invention relates to a stair-climbing hand truck with two casters held in a chassis and with a supporting foot which is arranged as a two-arm lever and is guided with its end opposite of the lower touchdown end over the lifting height along a supporting foot guide means and is connected with a crank mechanism between the touchdown end and the upper guided end.

DESCRIPTION OF THE PRIOR ART

Stair-climbing hand trucks such as wheelchairs or carts for transporting loads are provided with a lifting device with which the hand truck can be lifted or lowered from stair to stair. Favorable constructional conditions are obtained in this connection when the lifting device comprises a liftable and lowerable supporting foot which is placed on a step and lifts or lowers the chassis of the hand truck to the next step depending on the driving direction. To ensure that the casters can be lifted when moving upwardly over the next step and can be placed on the same, the supporting foot must not only perform a lifting movement relative to the chassis but also a movement in the driving direction. The same applies to a hand truck movement in a downstairs direction in order to lift the casters at first from the one step and to lower them around their front edges onto the step below. For this purpose it is known (EP 1 129 923 A2) to guide the upper end of the supporting foot in a guide rail extending over the lifting height of the supporting foot and to articulate the supporting foot between the lower touchdown end and the upper guide end on the crank of a crank mechanism. The swiveling movement of the supporting foot about the upper guide end which is caused by the crank mechanism in addition to the lifting movement is not sufficient in the case of limited space in order to lift or lower the casters over the next step. For this reason the casters are held on a crank arm of the crank mechanism which is offset by an angle of 180° relative to the crank for the drive of the supporting foot, so that the caster axles can be moved in addition along an orbit, which in connection with the phase-shifted drive of the supporting foot ensures the required movement of the casters relative to the touchdown end of the supporting foot for the purpose of overcoming a step both with respect to height and transversally thereto. The additional guidance of the casters along an orbit concentric to the axis of the crank mechanism renders this construction very complex however.

SUMMARY OF THE INVENTION

The invention is thus based on the object of providing a stair-climbing hand truck of the kind mentioned above with simple constructional means in such a way that despite a stationary bearing of the casters in the chassis it is possible to securely overcome steps with the help of a liftable and lowerable supporting foot.

The invention achieves this object in such a way that the crank mechanism acts upon a connecting rod linked to the supporting foot and that a connecting rod guide means which extends transversally to the supporting foot guide means is provided for the end of the connecting rod which is opposite of the supporting foot.

Since as a result of these measures the crank of the crank mechanism no longer acts upon the supporting foot in a direct manner but instead via a connecting rod which is guided transversally to the supporting foot guide means with its end opposite of the supporting foot, the connecting rod, due to its guidance at the end side, can be displaced at first with its touchdown end especially transversally to the supporting foot guide means during a travel downstairs from the idle position which is determined by the lifted supporting foot, leading to a swiveling of the supporting foot over the step receiving the casters before the supporting foot is substantially lowered via the connecting rod and placed on the next following lower step. After the touchdown of the touchdown end of the supporting foot on the lower step, the casters are lifted from the upper step and lowered over the front edge of the step to the lower step, which occurs with a simultaneous horizontal displacement because the return movement of the connecting rod to its starting position leads to a displacing movement of the connecting rod transversally to the supporting arm guide means. In the case of an upstairs movement, the supporting foot is placed on the step in a reverse sequence of movements on which the casters rest in order to place the casters around the front edge of the next higher step on the same. The progress of the supporting foot guidance and the connecting rod guidance and the effective lever conditions can be used to predetermine the respective movement paths which meet the requirements concerning the touchdown end of the supporting foot relative to the chassis for the respective lifting and lowering movement.

The supporting foot guide means can consist in the known manner of a guide crank for the upper end of the supporting foot. Especially simple constructional conditions are obtained when the supporting foot guide means consists of a guide connecting rod which is linked to the upper end of the supporting foot. Such a guide connecting rod could also be provided for the connecting rod guidance, but it is generally more advantageous as a result of the comparatively low amount of available space to provide a guide crank for the connecting rod guidance in order to achieve a sufficient transversal displacement of the connecting rod. An advantageous connecting rod movement is obtained when the guide crank for the transversal displacement of the connecting rod extends substantially radially to the crank mechanism.

BRIEF DESCRIPTION OF THE DRAWINGS

The invention is now explained in closer detail by reference to the enclosed drawings, wherein:

FIGS. 2 to 6 show this hand truck in different positions on a smaller scale while driving over stairs.

DESCRIPTION OF THE PREFERRED EMBODIMENTS

Figure 1:
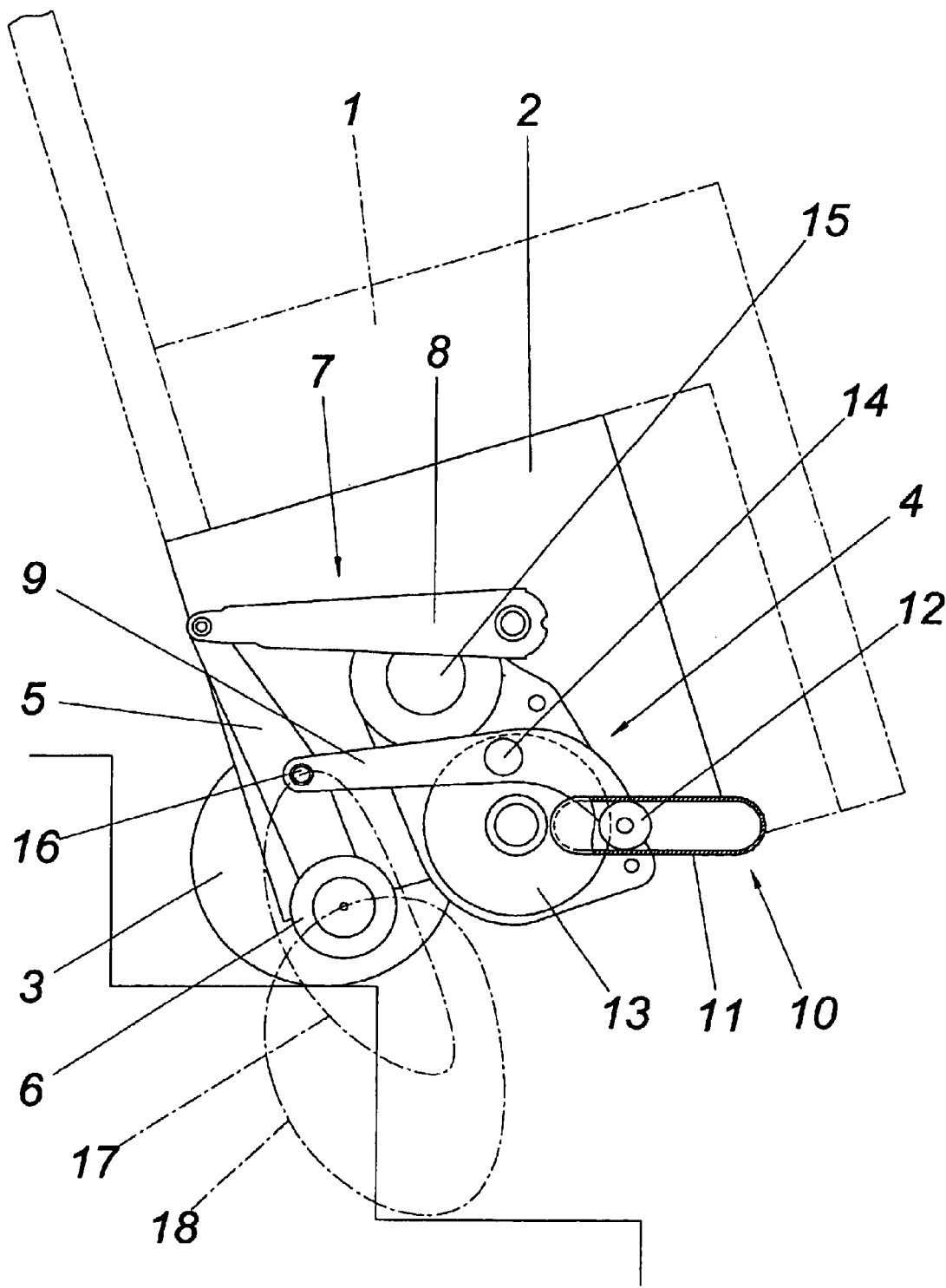
FIG. 1 shows a hand truck in accordance with the invention in a schematic side view.

The schematically indicated hand truck 1 which is a wheel-chair for example comprises in accordance with FIG. 1 casters 3 which are held in a chassis 2, of which the ones that are at the front in the represented side view are omitted for reasons of clarity of the illustration. The lifting device 4 which makes the handtruck 1 capable of climbing stairs comprises a supporting foot 5 which is arranged as a two-arm lever and carries supporting rollers 6 on its lower touchdown end. At the end which is opposite of the touchdown end there is a supporting foot guide means 7 in the form of a guide connecting rod 8 which is joined on the one hand to the chassis 2 and on the other hand to the upper end of the supporting foot 5. Between the touchdown end and the upper guide end of the supporting foot 5 a connecting rod 9 acts upon the same whose end, which is opposite of the supporting foot 5, is guided in a connecting rod guide means 10 transversally to the supporting foot guide means 7. Said guide means 10 is arranged according to the embodiment as a guide crank 11 into which a guide roller 12 engages at the end of the connecting rod 9. The connecting rod 9 is driven via a crank mechanism 13 whose crank pin is designated with reference numeral 14, which pin carries the connecting rod 9. The drive of the crank mechanism 13 is performed via an electric motor 15. In the initial position as shown in FIG. 1 of the lifting device 4, the supporting foot 5 is situated in an upper lifting position, with., the guide connecting rod 8 extending in an approximately horizontal fashion in the illustration inclined position which is predetermined for traveling over stairs, as also applies to the connecting rod guide means 10 which is aligned radially to the crank drive 13. As a result of this alignment of the connecting rod guide means 10 and the chosen angular configuration of the connecting rod 9, a movement path 17 which is indicated with the dot-dash line is obtained during a rotation of the crank drive 13 for the link axle 16 between the connecting rod 9 and the supporting foot 5, which path produces a movement path 18 for the supporting rollers 6 as a result of the chosen lever conditions and the guidance of the supporting foot 5 via the guide connecting rod 8.

In FIGS. 2 to 6, the sequence of movements for the lifting device 4 as predetermined by the movement path 18 is explained on the basis of individual movement steps for traveling down stairs. The hand truck 1 is roiled on the respective step 19 towards the front edge of the step 19 until the casters 3 are braked in the conventional manner by the guide rollers dropping at the front edge. The crank drive 13 which is then driven via the motor 15 causes a displacement of the supporting foot 5 from the initial position as shown in FIG. 2 with the braked casters 3 substantially beyond the front edge of the step 19, with the supporting rollers 6 being moved above the step 19 beyond its front edge before the supporting foot 5 is placed on the subsequent lower step 20, as is shown in the sequence of movements as shown in FIGS. 3 and 4. After the touchdown of the supporting wheels 6 on then lower step 20, the chassis 2 with the casters 3 is lifted off from the upper step 19 (FIG. 4) as a result of the further downward movement of the supporting foot 5 and is subsequently placed on the lower step 20, as is shown in FIGS. 5 and 6. After the touchdown of the casters 3 on the lower step 20, the supporting foot 5 is lifted to the initial position again (FIG. 6), so that the hand truck 1 is rolled towards the front edge of step 20 again and can be lowered by one step again. The sequence of movement occurs in the reverse order when climbing up the stairs.

What is claimed is:

1. A stair-climbing hand truck comprising two casters held in a chassis and
    a supporting foot constituted by a two-arm lever having a lower support end and an upper end,
    a supporting foot guide means connected to and guiding the upper end of the two-arm lever,
    a connecting rod having one end linked to the two-arm lever between the lower support end and the upper end, and an end opposite to the one end guided in a connecting rod guide means extending transversely to the supporting foot guide means, and
    a crank mechanism connected to the connecting rod.

2. The hand truck of claim 1, wherein the supporting foot guide means is comprised of a guide connecting rod having one end linked to the chassis and an end opposite to the one end linked to the upper end of the two-arm lever.

3. The hand truck of claim 1, wherein the connecting rod guide means extends radially to the crank mechanism.

* * * * *